United States Patent
Massie et al.

(10) Patent No.: US 9,532,155 B1
(45) Date of Patent: Dec. 27, 2016

(54) REAL TIME MONITORING OF ACOUSTIC ENVIRONMENTS USING ULTRASOUND

(71) Applicant: Knowles Electronics, LLC, Itasca, IL (US)

(72) Inventors: Dana Massie, Santa Cruz, CA (US); Sumit Sanyal, Santa Cruz, CA (US)

(73) Assignee: Knowles Electronics, LLC, Itasca, IL (US)

( * ) Notice: Subject to any disclaimer, the term of this patent is extended or adjusted under 35 U.S.C. 154(b) by 3 days.

(21) Appl. No.: 14/549,325

(22) Filed: Nov. 20, 2014

Related U.S. Application Data

(60) Provisional application No. 61/906,831, filed on Nov. 20, 2013.

(51) Int. Cl.
H04R 29/00 (2006.01)

(52) U.S. Cl.
CPC ..................... H04R 29/00 (2013.01)

(58) Field of Classification Search
None
See application file for complete search history.

(56) References Cited

U.S. PATENT DOCUMENTS 5,845,004 A * 12/1998 Banjanin ............ G01S 7/52071
382/128
8,718,299 B2  5/2014 Nishimura et al.
8,907,929 B2 * 12/2014 Li ......................... G01S 7/5273
345/177
9,111,522 B1 * 8/2015 Worley, III ............ G10K 11/16
9,143,851 B2  9/2015 Schober
(Continued)

FOREIGN PATENT DOCUMENTS

CN  104247280 A  12/2014
EP  2962403 A1  1/2016
(Continued)

OTHER PUBLICATIONS

International Search Report & Written Opinion dated Jun. 26, 2014 in Patent Cooperation Treaty Application No. PCT/US2014/018780, filed Feb. 26, 2014.
(Continued)

*Primary Examiner* — Paul Huber
(74) *Attorney, Agent, or Firm* — Foley & Lardner LLP

(57) ABSTRACT

Systems and methods for real time monitoring of acoustic environment using ultrasound are provided. An example method includes causing production of an acoustic sensing signal. The acoustic sensing signal can be a continuously repeating ultrasonic signal. The method further includes receiving a reflected acoustic signal, the reflected acoustic signal being a representation of an acoustic signal reflected within the acoustic environment. The method further includes analyzing the reflected acoustic signal based at least in part on the acoustic sensing signal to determine properties of the acoustic environment. The acoustic sensing signal can be produced based on a pseudorandom binary sequence. Analyzing the reflected acoustic signal includes correlating the reflected acoustic signal and the acoustic sensing signal to determine a real time estimate of impulse response of the acoustic environment. The method further allows determining that the properties of the acoustic environment have changed.

17 Claims, 4 Drawing Sheets

(56) References Cited

U.S. PATENT DOCUMENTS

| | | |
|---|---|---|
| 9,319,816 B1 * | 4/2016 | Narayanan .......... G10L 21/0202 |
| 2002/0036624 A1 | 3/2002 | Ohta et al. |
| 2004/0029622 A1 | 2/2004 | Laroia et al. |
| 2004/0114772 A1 | 6/2004 | Zlotnick |
| 2006/0074658 A1 | 4/2006 | Chadha |
| 2007/0073536 A1 | 3/2007 | Clark et al. |
| 2007/0262863 A1 | 11/2007 | Aritsuka et al. |
| 2008/0140479 A1 | 6/2008 | Mello et al. |
| 2008/0157129 A1 | 7/2008 | Hsu et al. |
| 2009/0254351 A1 | 10/2009 | Shin et al. |
| 2009/0270141 A1 | 10/2009 | Sassi |
| 2010/0312547 A1 | 12/2010 | Van Os et al. |
| 2011/0029359 A1 | 2/2011 | Roeding et al. |
| 2011/0255709 A1 | 10/2011 | Nishimura et al. |
| 2011/0275348 A1 | 11/2011 | Clark et al. |
| 2011/0293102 A1 | 12/2011 | Kitazawa et al. |
| 2011/0293103 A1 | 12/2011 | Park et al. |
| 2012/0166184 A1 | 6/2012 | Locker et al. |
| 2012/0224456 A1 | 9/2012 | Visser et al. |
| 2013/0097437 A9 | 4/2013 | Naveh et al. |
| 2013/0260727 A1 | 10/2013 | Knudson et al. |
| 2014/0006825 A1 | 1/2014 | Shenhav |
| 2014/0244273 A1 | 8/2014 | Laroche et al. |
| 2014/0348345 A1 | 11/2014 | Furst et al. |
| 2015/0193841 A1 | 7/2015 | Bernard |

FOREIGN PATENT DOCUMENTS

| | | |
|---|---|---|
| KR | 1020150121038 | 10/2015 |
| WO | WO2013150325 A1 | 10/2013 |
| WO | WO2014134216 A1 | 9/2014 |
| WO | WO2015103606 A1 | 7/2015 |

OTHER PUBLICATIONS

International Search Report & Written Opinion dated May 1, 2015 in Patent Cooperation Treaty Application No. PCT/US2015/010312, filed Jan. 6, 2015, 12 pp.

* cited by examiner

REAL TIME MONITORING OF ACOUSTIC ENVIRONMENTS USING ULTRASOUND

CROSS-REFERENCE TO RELATED APPLICATION

The present application claims the benefit of U.S. Provisional Application No. 61/906,831, filed on Nov. 20, 2013. The subject matter of the aforementioned applications is incorporated herein by reference for all purposes.

FIELD

The present application relates generally to determining acoustic properties of environments, and more specifically to systems and methods for real-time monitoring of properties of acoustic environments using ultrasound.

BACKGROUND

Acoustic properties of a room or other spaces can be important in various techniques, for example, in music recording and playback. Measurement of acoustic properties can involve spectral characterizations of acoustic absorption and reverberation properties. Such characterizations have been put to many uses, for example, to improve intelligibility or to create reverberation effects. However, existing static measurement techniques may not be adequate for use in mobile devices and other contexts having mobile properties, which may require the ability to continuously monitor and update the acoustic signature of a room or other space with respect to the mobile device and/or other mobile properties.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Methods and systems for real time monitoring of acoustic environments using ultrasound are provided. According to an example embodiment, a method for real time monitoring of acoustic environments includes causing production of an acoustic sensing signal. The acoustic sensing signal can be an ultrasonic signal. The method can further include analyzing a reflected acoustic signal based at least in part on the acoustic sensing signal to determine properties of an acoustic environment, the reflected acoustic signal being a representation of the acoustic sensing signal reflected within the acoustic environment.

In some embodiments, the acoustic sensing signal is produced based at least in part on a pseudorandom binary sequence. In certain embodiments, the pseudorandom binary sequence includes a maximum length sequence. The acoustic sensing signal can be outside of the frequency range of both human and domestic animal hearing.

In some embodiments, analyzing the reflected acoustic signal can include correlating the reflected acoustic signal and the acoustic sensing signal to determine a real time estimate of an impulse response of the acoustic environments. The length of the acoustic sensing signal can be designed to be long enough to avoid time aliasing and, at the same time, short enough to update results of the correlation quickly.

In some embodiments, the acoustic sensing signal can be caused to be produced by at least one loudspeaker of a mobile device. The at least one loudspeaker can be configured to produce signals having a frequency in the ultrasonic range. In some embodiments, the loudspeaker can also be configured to also produce an acoustic signal with a frequency within a human range of hearing, for example, in the form of music or speech. In some embodiments where the acoustic sensing signal is caused to be produced in the ultrasonic range and the loudspeaker is also caused to produce another acoustic signal within the range of human hearing (e.g. a "regular signal"), the acoustic sensing signal is superimposed onto the regular signal.

In some embodiments, the reflected acoustic signal can be received via at least one microphone associated with the mobile device. The microphone can be configured to capture the ultrasonic range signals. In some embodiments, the method can further include determining that the properties of the acoustic environment have changed. In response to the determination, the method can proceed with configuring one or more applications of the mobile device.

According to another example embodiment of the present disclosure, steps of the method for real time monitoring of an acoustic environment can be stored on a machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The present disclosure provides example systems and methods for monitoring acoustic environments using ultrasound. Embodiments of the present disclosure can be practiced on any mobile device. Mobile devices can be portable or stationary. Mobile devices can include: radio frequency (RF) receivers, transmitters, and transceivers; wired and/or wireless telecommunications and/or networking devices; amplifiers; audio and/or video players; encoders; decoders; loudspeakers; inputs; outputs; storage devices; user input devices. Mobile devices can include input components such as buttons, switches, keys, keyboards, trackballs, sliders, touch screens, one or more microphones, gyroscopes, accelerometers, global positioning system (GPS) receivers, and the like. Mobile devices can include output components, such as LED indicators, video displays, touchscreens, loudspeakers, and the like. In some embodiments, mobile devices may be hand-held devices, such as wired and/or wireless remote controls, notebook computers, tablet computers, phablets, smart phones, personal digital assistants, media players, mobile telephones, and the like.

Mobile devices can be used in stationary and mobile environments. Stationary environments may include residencies and commercial buildings or structures. Examples of stationary environments include living rooms, bedrooms, home theaters, conference rooms, auditoriums, and the like. For mobile environments, the systems may be moving with a vehicle, carried by a user, or be otherwise transportable.

According to an example embodiment, a method for real time monitoring of acoustic environments includes causing production of an acoustic sensing signal. The acoustic sensing signal can be an ultrasonic signal (e.g., an acoustic signal having a frequency within the ultrasonic range). The method can further include analyzing a reflected acoustic signal based at least in part on the acoustic sensing signal to determine properties of the acoustic environment, the reflected acoustic signal being a representation of the acoustic sensing signal reflected within the acoustic environment.

Figure 1:
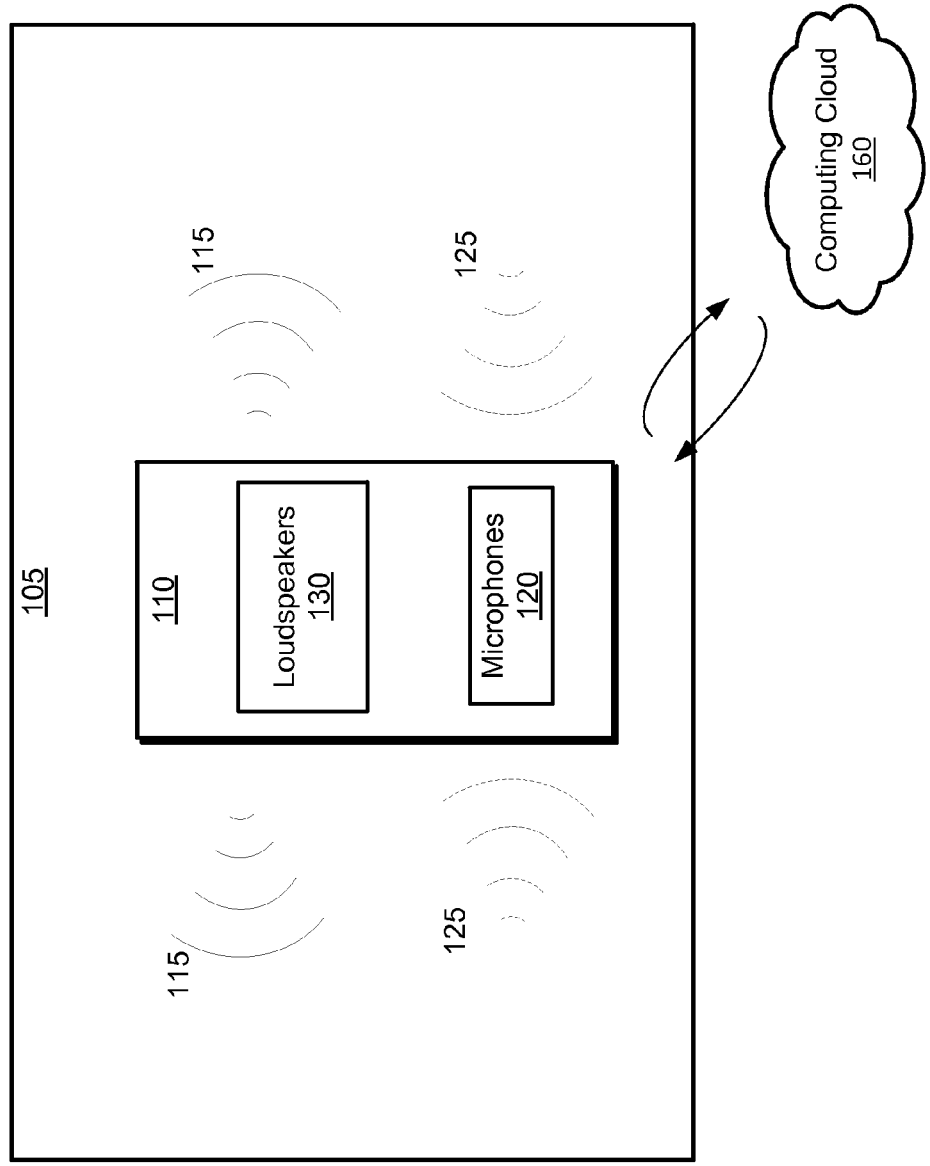
FIG. 1 is block diagram showing an example environment in which methods for real time monitoring of acoustic environments using ultrasound can be practiced.

Referring now to FIG. 1, an exemplary environment 100 is shown in which a method for monitoring acoustic environment can be practiced. Example environment 100 can include a mobile device 110 located in a space 105. The space 105 can include a room, a car, or any other space capable of reflecting acoustic signals. The mobile device 110 can be operable to transmit an acoustic sensing signal 115 and receive back a reflected acoustic signal 125. The acoustic sensing signal can include an ultrasonic signal which is continuously repeated. In certain embodiments, the mobile device 110 includes one or more loudspeaker(s) 130 configurable to emit the ultrasonic signal. In some embodiments, the mobile device 110 includes one or more microphone(s) 120 configured to capture the reflected acoustic signal. In various embodiments, the mobile device 110 analyzes the reflected acoustic audio signal to determine properties of the closed space 105.

In some embodiments, the mobile device 110 is communicatively connected to a cloud-based computing resource(s) 160, also referred to as a computing cloud. The cloud-based computing resource(s) 160 can include computing resources (hardware and software) available at a remote location and accessible over a network (for example, the Internet). The cloud-based computing resources 160 can be shared by multiple users and can be dynamically re-allocated based on demand. The cloud-based computing resources 160 may include one or more server farms/clusters including a collection of computer servers which can be co-located with network switches and/or routers. In various embodiments, the mobile device 110 can be connected to the computing cloud 160 via one or more wired or wireless network(s). The mobile device 110 is operable to send data to computing cloud 160, request computational operations to be performed in the computing cloud, and receive back the results of the computational operations.

Figure 2:
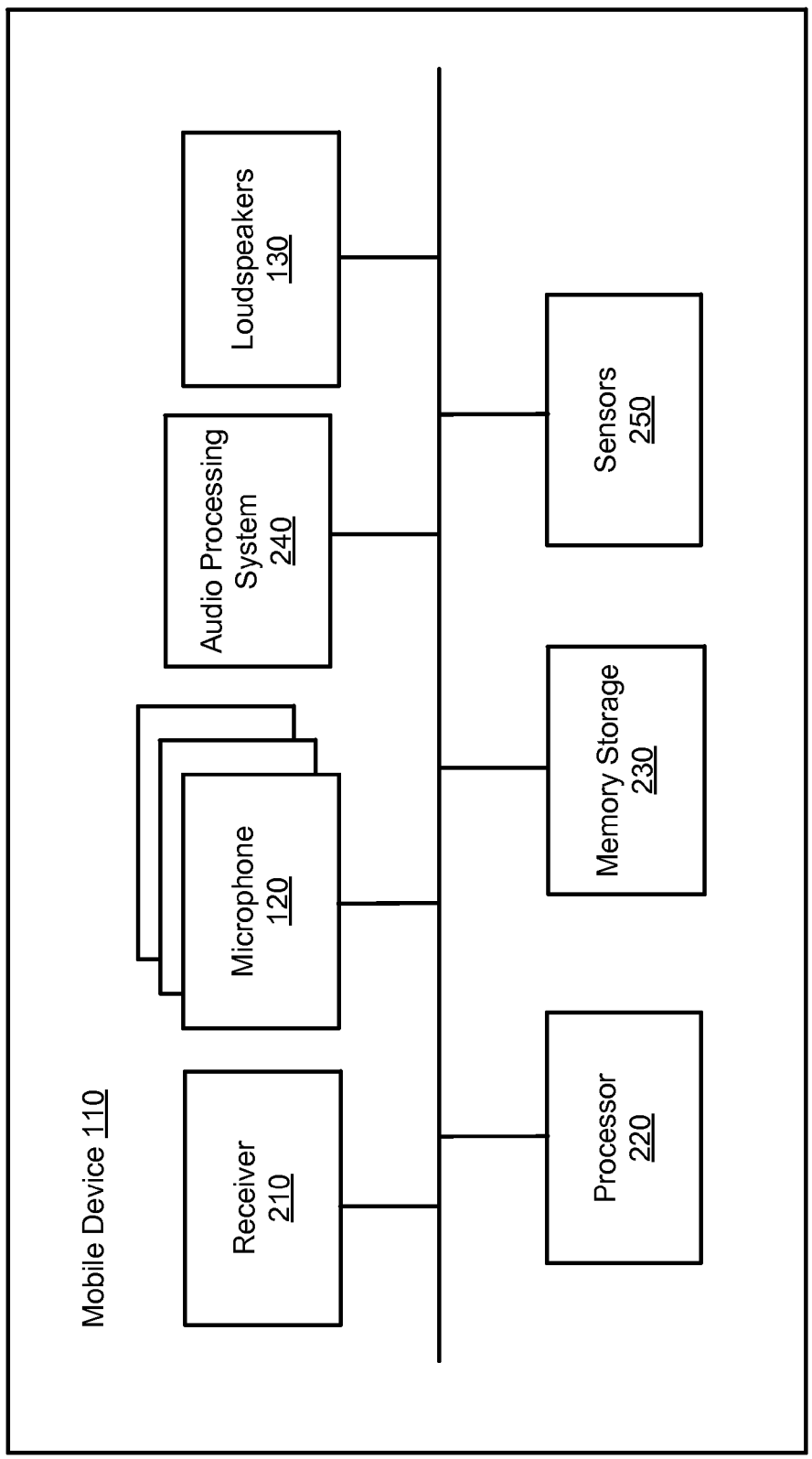
FIG. 2 is a block diagram showing a mobile device that can implement a method for real time monitoring of acoustic environments, according to an example embodiment.

FIG. 2 is a block diagram illustrating components of a mobile device, according to an example embodiment. FIG. 2 provides additional details for the mobile device 110 described above with reference to FIG. 1. In the illustrated embodiment, the mobile device 110 includes a receiver 210, one or more microphone(s) 120, one or more loudspeaker(s) 130, a processor 220, memory storage 230, an audio processing system 240, and sensors 250. In other embodiments, the mobile device 110 can include additional or other components necessary for operations of mobile device 110.

Similarly, the mobile device 110 can include fewer components that perform functions similar or equivalent to those depicted in FIG. 2.

The processor 220 can include hardware and/or software, which is operable to execute computer programs stored in memory storage 230. The processor 220 can use floating point operations, complex operations, and other operations, including those facilitating monitoring of an acoustic environment using ultrasound. In some embodiments, the processor 220 includes at least one of the following: a digital signal processor, an image processor, an audio processor, a general-purpose processor, and the like.

The audio processing system 240 can be configured to receive acoustic signals captured by one or more microphone 120 and process the acoustic signal components. In some embodiments, the microphones 120 can be spaced a distance apart such that the acoustic waves impinging on the device from certain directions can exhibit different energy levels at the two or more microphones. After receipt by the microphones 120, the acoustic signals can be converted into electric signals. These electric signals can, in turn, be converted by an analog-to-digital converter (not shown) into digital signals for processing in accordance with some embodiments described herein.

In various embodiments, where the microphones 120 are omni-directional microphones that are closely spaced (e.g., 1-2 cm apart), a beamforming technique can be used to simulate a forward-facing and backward-facing directional microphone response. A level difference can be obtained using a simulated forward-facing and backward-facing directional microphone. The level difference can be used to discriminate speech and noise in, for example, the time-frequency domain, which can be used in noise and/or echo reduction. In some embodiments, some microphones can be used mainly to detect speech and other microphones can be used mainly to detect noise. In various embodiments, some microphones are used to detect both noise and speech.

In some embodiments, the audio processing system 240 is configured to carry out noise suppression and/or noise reduction based on an inter-microphone level difference, level salience, pitch salience, signal type classification, loudspeaker identification, and so forth. An example audio processing system suitable for performing noise reduction is discussed in more detail in U.S. Pat. No. 8,473,287, issued on Jun. 25, 2013, the disclosure of which is incorporated herein by reference for all purposes. By way of example and not limitation, noise reduction methods are described in U.S. patent application Ser. No. 12/215,980, filed Jun. 30, 2008, and in U.S. Pat. No. 8,194,880, issued Jun. 5, 2012, which are incorporated herein by reference in their entireties.

In some embodiments, the microphones 120 are suitably designed, modified, and/or constructed to additionally support the higher frequency response of the sensing ultrasonic signal(s).

In some embodiments, the loud speakers (also referred to as "speakers") 130 are suitably designed, modified, and/or constructed to support the higher frequency response of the sensing signal. In certain embodiments, the loudspeakers 130 are configured to emit a signal having a frequency within the ultrasonic range. In other embodiments, the loudspeakers 130 are also configured to play a regular audio signal (e.g. a signal having a frequency within the range of human hearing), for example music, speech, and the like. The acoustic sensing ultrasonic signal can be superimposed on any other speech or music signal (e.g., in the normal human hearing range of approximately 20 Hz to 20,000 Hz), currently being played by the loudspeakers 130.

In various embodiments, the sensors 250 include motion sensors, inertial sensors, proximity sensors, visual sensors, location sensors, and the like. The sensors can include an accelerometer, a gyroscope, an Inertial Measurement Unit (IMU), a temperature sensor, an altitude sensor, a proximity sensor, a barometer, a humidity sensor, a color sensor, a light sensor, a pressure sensor, a Global Positioning System (GPS) module, a beacon, a (video) camera, a WiFi sensor, an ultrasound sensor, an infrared sensor, and a touch sensor.

Figure 3:
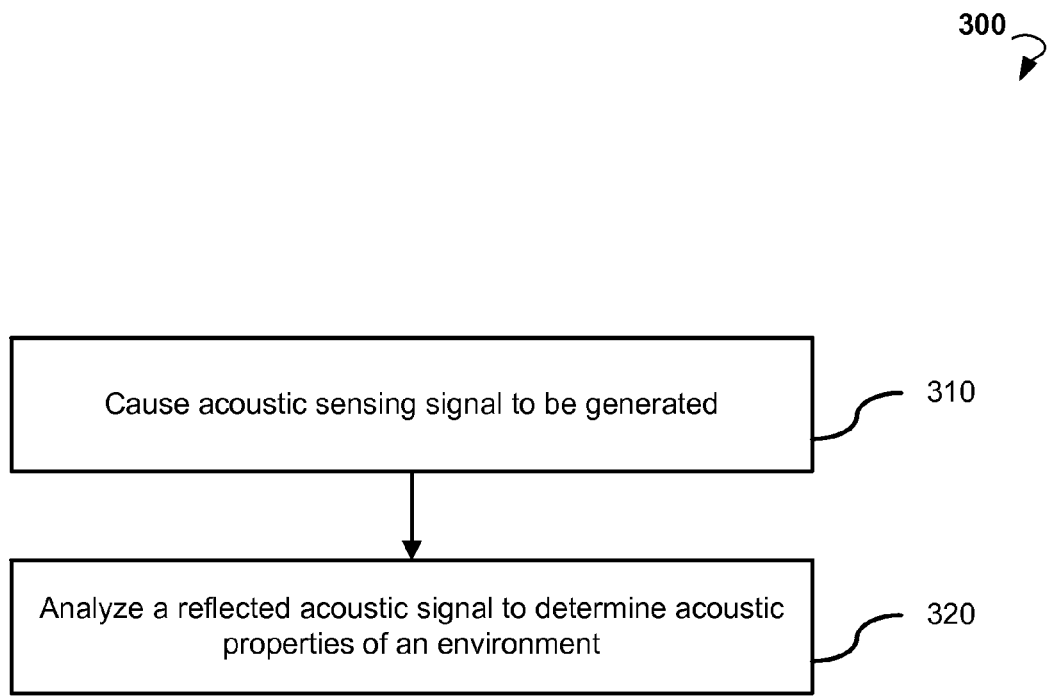
FIG. 3 is a flowchart showing steps of a method for real time monitoring of acoustic environments, according to an example embodiment.

FIG. 3 is a flow chart showing steps of a method 300 for real time monitoring of acoustic environments, according to an example embodiment. The steps of method 300 can be performed with the components of mobile device shown in FIG. 2. Some steps of method 300 can be combined, performed in parallel, or performed in a different order. In further embodiments, the method 300 includes additional or fewer steps than those illustrated in FIG. 3.

In some embodiments, the example method 300 can be practiced when the mobile device is in an acoustic sensing mode. At step 310, the method can cause an acoustic sensing signal to be generated. The frequency of the produced acoustic sensing signal can be in the ultrasonic range, so as to be well above the upper frequency limit of humans and domestic pets, and hence non-intrusive. Ultrasound is generally in the frequency above the upper limit of the human hearing range, for example, from about 20 KHz to several gigahertz.

In some embodiments, the sensing signal can be generated using Pseudorandom Binary Sequence (PRBS), for example, a Maximum Length Sequences (MLS) or other. The impulse response of an environment such as, for example a room, can be measured using a continuously repeating sequence. The MLS is a type of the PRBS generated using maximum linear feedback shift registers. The MLS are periodic and reproduce every binary sequence that can be represented by the shift registers (for example, for length m registers, signals having a sequence of length 2m−1 can be produced).

In various embodiments, the acoustic sensing signal is caused to be emitted/(re-)produced using the loudspeakers 130 of the mobile device 110. In some embodiments, the acoustic sensing signal is superimposed on another speech or music signal, currently being emitted/(re-)produced by the mobile device's loudspeaker(s). In certain embodiments, the acoustic sensing signal is generated using MLS or other PRBS within a mobile device, by cloud-based computing resources, or combinations thereof, and recorded in an audio file. The audio file can be used by the mobile device to produce the previously recorded acoustic sensing signal.

At step 320, a reflected acoustic signal is processed and analyzed. The reflected acoustic signal can be a representation of the acoustic sensing signal reflected within the acoustic environment. The reflected acoustic sensing signal can be continuously recorded and cross-correlated with the original MLS and used to extract a real-time estimate of the impulse response of the environment. Based on the impulse response, other properties of the acoustic environment, like a frequency response, are estimated. In some embodiments, the directionality or other aspects of the reflected acoustic sensing signal may be determined.

In certain embodiments, the length of the original MLS (or other PRBS), which can be used to generate the acoustic sensing signal, is designed to be long enough to avoid time aliasing of the received signal(s). The original MLS (or other PRBS) can generate the acoustic sensing signal to be short enough that the correlations between the acoustic sensing signal and the reflected sensing signal can be updated at a fast enough rate, so as to be able to update the real time environment acoustic estimate to keep up with changes in the environment. For example, the changes in the acoustic environment can be caused by people walking around within the acoustic environment, doors opening and closing within the acoustic environment, and so on. Additionally, in some embodiments, inputs from sensors 250 of the mobile device 110 are used to guide analysis of the reflected acoustic signal(s). For example, Global Positioning System (GPS), Wi-Fi triangulation, and the like may be used to determine location information. The location information can used to determine environment changes, which, in turn, can be used in part to determine the estimate. In various embodiments, the analysis of the reflected signal can be performed by the mobile device, by cloud-based computing resources, or combinations thereof.

Based upon the method 300, one or more applications of the mobile device can be caused to be configured based on the acoustic properties of the environment. For example, the method can include setting modes for speech and music conditioning systems on the mobile device (for example, virtual surround sound systems, noise and echo cancellation systems, and the like).

The method 300 may also be configured to provide input, based on the properties of the acoustic environment, to one or more applications of the mobile device.

In some embodiments, a position of the mobile device can be tracked in the acoustic space. For example, when the mobile device moves in/out of an acoustic environment, such as a room or a car, or when a window or a door of an acoustic environment is opened or closed. The opening and closing of the door can detected as changes in the properties of the acoustic environment. In other embodiments, changes in the properties of the acoustic environment can be used to track the position of other people or pets inside a room.

In some embodiments, the properties of the acoustic environment are monitored and are used in context (surrounding) aware applications. For example, if a room is known as a child's bedroom (e.g., a "quiet environment"), in response to a user entering such a quiet environment of the room, a vibration mode (instead of, for example, ringing) can be automatically enabled on the mobile phone. This would be useful, for example, when putting a child to sleep. In other embodiments, the monitored properties of acoustic environment can be used in virtual reality games.

Some embodiments of the technology for monitoring of an acoustic environment using acoustic signals can be optimized to conserve power. Since systems and methods described herein can be practiced on battery-operated mobile devices, keeping power consumption low can be a key feature. In various embodiments, one or more of the following parameters can be dynamically adapted based on a rate of change of the acoustic environment, to trade off power consumption and accuracy of the estimate:

1) A duty cycle of the generation of the acoustic sensing signal via an MLS over the loudspeaker(s). In an acoustically stationary environment, the acoustic sensing signal can be transmitted less frequently and the response can be checked to make sure that nothing has 'moved'. In response to a change being detected, the acoustic sensing signal can be transmitted more frequently (e.g., continuously), until the change is no longer present.

2) The amplitude of the transmitted signal is lowered, for example, when accuracy (for example, high Signal to Noise Ratio (SNR)) is not required or in less absorptive settings.

3) The length of the MLS sequence is varied to save power or increase accuracy.

4) The rate at which the correlation is updated on the received signal is varied.

5) Number of microphones used is varied to trade off accuracy and power.

6) Inputs from other sensor devices of the mobile device, when available, are used to reduce the frequency of updates.

Figure 4:
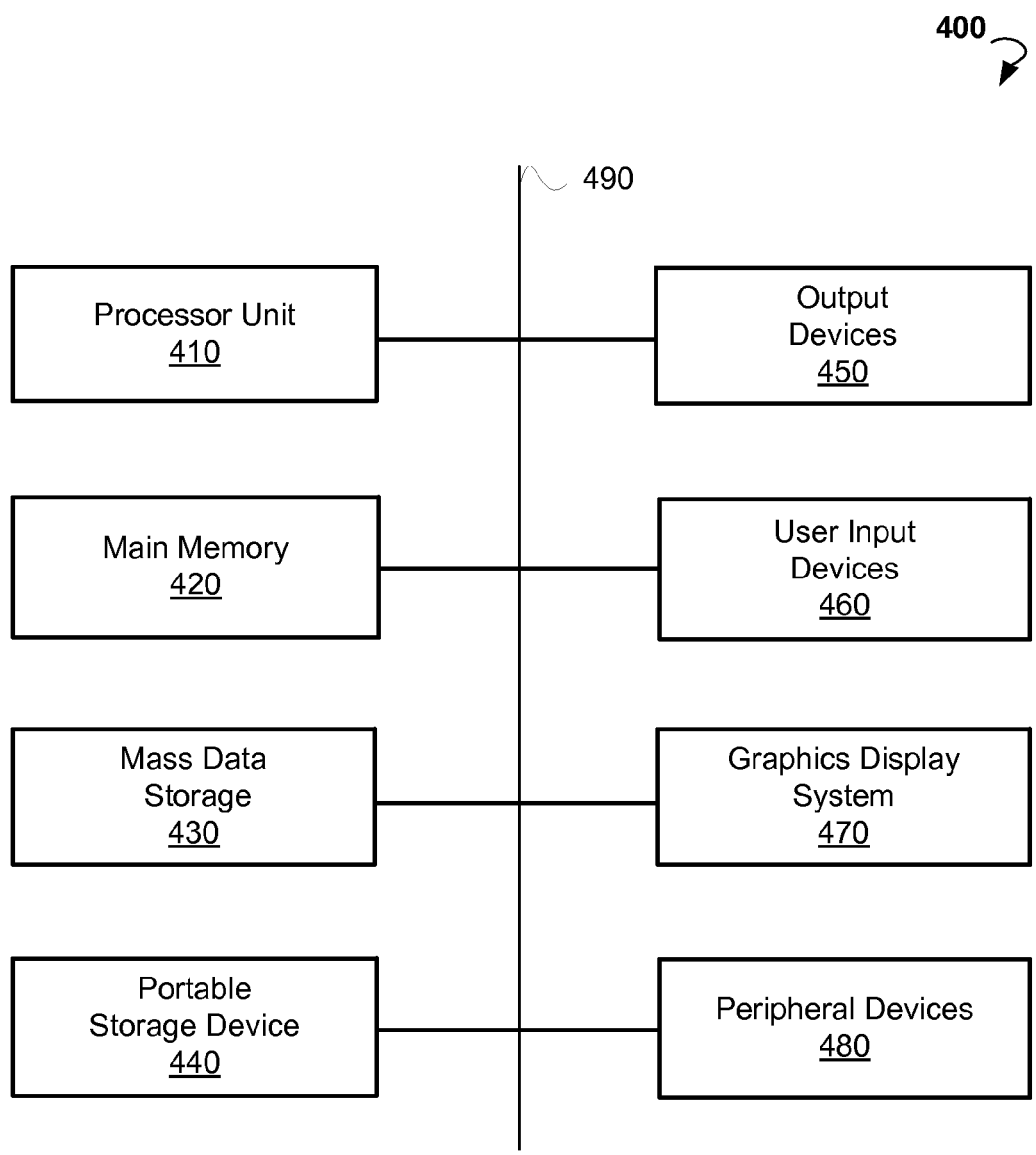
FIG. 4 is block diagram of an example computer system that may be used to implement embodiments of the present disclosure.

FIG. 4 illustrates an exemplary computer system 400 that may be used to implement some embodiments of the present invention. The computer system 400 of FIG. 4 may be implemented in the contexts of the likes of computing systems, networks, servers, or combinations thereof. The computer system 400 of FIG. 4 includes one or more processor units 410 and main memory 420. Main memory 420 stores, in part, instructions and data for execution by processor units 410. Main memory 420 stores the executable code when in operation, in this example. The computer system 400 of FIG. 4 further includes a mass data storage 430, portable storage device 440, output devices 450, user input devices 460, a graphics display system 470, and peripheral devices 480.

The components shown in FIG. 4 are depicted as being connected via a single bus 490. The components may be connected through one or more data transport means. Processor unit 410 and main memory 420 is connected via a local microprocessor bus, and the mass data storage 430, peripheral device(s) 480, portable storage device 440, and graphics display system 470 are connected via one or more input/output (I/O) buses.

Mass data storage 430, which can be implemented with a magnetic disk drive, solid state drive, or an optical disk drive, is a non-volatile storage device for storing data and instructions for use by processor unit 410. Mass data storage 430 stores the system software for implementing embodiments of the present disclosure for purposes of loading that software into main memory 420.

Portable storage device 440 operates in conjunction with a portable non-volatile storage medium, such as a flash drive, floppy disk, compact disk, digital video disc, or Universal Serial Bus (USB) storage device, to input and output data and code to and from the computer system 400 of FIG. 4. The system software for implementing embodiments of the present disclosure is stored on such a portable medium and input to the computer system 400 via the portable storage device 440.

User input devices 460 can provide a portion of a user interface. User input devices 460 may include one or more microphones, an alphanumeric keypad, such as a keyboard, for inputting alphanumeric and other information, or a pointing device, such as a mouse, a trackball, stylus, or cursor direction keys. User input devices 460 can also include a touchscreen. Additionally, the computer system 400 as shown in FIG. 4 includes output devices 450. Suitable output devices 450 include loudspeakers, printers, network interfaces, and monitors.

Graphics display system 470 include a liquid crystal display (LCD) or other suitable display device. Graphics display system 470 is configurable to receive textual and graphical information and processes the information for output to the display device.

Peripheral devices 480 may include any type of computer support device to add additional functionality to the computer system.

The components provided in the computer system 400 of FIG. 4 are those typically found in computer systems that may be suitable for use with embodiments of the present disclosure and are intended to represent a broad category of such computer components that are well known in the art. Thus, the computer system 400 of FIG. 4 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 400 is implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for real time monitoring of properties of an acoustic environment, the method comprising:

causing production of a regular acoustic signal, the regular acoustic signal being within a human range of hearing;

causing production of an acoustic sensing signal superimposed over the regular acoustic signal, the acoustic sensing signal having a frequency in the ultrasonic range; and analyzing a reflected acoustic signal based at least in part on the acoustic sensing signal to determine the properties of the acoustic environment, the reflected acoustic signal being a representation of the acoustic sensing signal reflected within the acoustic environment;

wherein the acoustic sensing signal is caused to be produced by at least one loudspeaker of a mobile device, the at least one loudspeaker being configured to produce ultrasonic range signals.

2. The method of claim 1, wherein the acoustic sensing signal is caused to be produced based at least in part on a pseudorandom binary sequence.

3. The method of claim 2, wherein the pseudorandom binary sequence includes a maximum length sequence.

4. The method of claim 1, wherein the frequency of the acoustic sensing signal is configured so as to be at least outside of the range of domestic pet hearing.

5. The method of claim 1, wherein the analyzing the reflected acoustic signal includes correlating the reflected acoustic signal and the acoustic sensing signal to determine a real time estimate of an impulse response of the acoustic environment.

6. The method of claim 5, wherein a length of the acoustic sensing signal is designed to be:
   long enough to avoid time aliasing; and
   short enough to update results of the correlation at a fast rate.

7. The method of claim 1, wherein the acoustic signal reflected within the acoustic environment is received via at least one microphone of the mobile device, the at least one microphone being configured to capture the ultrasonic range signals.

8. The method of claim 1, further comprising:
   determining the properties of the acoustic environment have changed; and
   in response to the determination, configuring one or more applications of the mobile device.

9. The method of claim 1 wherein the acoustic sensing signal is caused to be produced continuously over a predetermined time period.

10. A system for real time monitoring of properties of an acoustic environment, the system comprising:
   a processor; and
   a memory communicatively coupled with the processor, the memory storing instructions which when executed by the processor perform a method comprising:
      causing production of an acoustic sensing signal, the acoustic sensing signal having a frequency in the ultrasonic range; and
      analyzing a reflected acoustic signal based at least in part on the acoustic sensing signal to determine the properties of the acoustic environment, the reflected acoustic signal being a representation of the acoustic sensing signal reflected within the acoustic environment;
   wherein the acoustic sensing signal is caused to be produced by at least one loudspeaker of a mobile device, the at least one loudspeaker being configured to produce ultrasonic range signals,
   wherein the at least one loudspeaker is further configured to produce a regular acoustic signal, the regular acoustic signal being within a human range of hearing, and
   wherein the acoustic sensing signal is superimposed over the regular acoustic signal.

11. The system of claim 10, wherein the acoustic sensing signal is caused to be produced based at least in part on a pseudorandom binary sequence, the pseudorandom binary sequence including a maximum length sequence.

12. The system of claim 10, wherein the frequency of the acoustic sensing signal is configured to be at least outside of the range of domestic pet hearing.

13. The system of claim 10, wherein analyzing the reflected acoustic signal includes correlating the reflected acoustic signal and the acoustic sensing signal to determine a real time estimate of an impulse response of the acoustic environment.

14. The system of claim 13, wherein a length of the acoustic sensing signal is designed to be:
   long enough to avoid time aliasing; and
   short enough to update results of the correlation at a fast rate.

15. The system of claim 10, wherein the acoustic signal reflected within the acoustic environment is received via at least one microphone of the mobile device, the at least one microphone being configured to capture the ultrasonic range signals.

16. The system of claim 10, further comprising:
   determining that the properties of the acoustic environment have changed; and
   in response to the determination, configuring one or more applications of the mobile device in response to the determination.

17. A non-transitory computer-readable storage medium having embodied thereon instructions, which when executed by one or more processors, perform steps of a method, the method comprising:
   causing production of a regular acoustic signal, the regular acoustic signal being within a human range of hearing;
   causing production of an acoustic sensing signal superimposed over the regular acoustic signal, the acoustic sensing signal having a frequency in the ultrasonic range; and
   analyzing a reflected acoustic signal based at least in part on the acoustic sensing signal to determine the properties of the acoustic environment, the reflected acoustic signal being a representation of the acoustic sensing signal reflected within the acoustic environment;
   wherein the acoustic sensing signal is caused to be produced by at least one loudspeaker of a mobile device, the at least one loudspeaker being configured to produce ultrasonic range signals.

* * * * *